United States Patent
Erdmann et al.

(10) Patent No.: US 9,715,353 B2
(45) Date of Patent: Jul. 25, 2017

(54) DATA SET MANAGEMENT

(71) Applicant: INTERNATIONAL BUSINESS MACHINES CORPORATION, Armonk, NY (US)

(72) Inventors: Derek L. Erdmann, Tucson, AZ (US); Franklin E. McCune, Tucson, AZ (US); Miguel A. Perez, Miami, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 14/488,223

(22) Filed: Sep. 16, 2014

(65) Prior Publication Data

US 2016/0077750 A1    Mar. 17, 2016

(51) Int. Cl.
*G06F 3/06* (2006.01)

(52) U.S. Cl.
CPC ............ *G06F 3/0685* (2013.01); *G06F 3/061* (2013.01); *G06F 3/0647* (2013.01); *G06F 3/0652* (2013.01); *G06F 2003/0692* (2013.01)

(58) Field of Classification Search
CPC .... G06F 3/0646; G06F 3/0647; G06F 3/0649; G06F 3/065; G06F 3/0652; G06F 3/0655; G06F 11/1448; G06F 11/1451; G06F 12/0868; G06F 12/0891; G06F 12/121; G06F 12/122; G06F 12/123; G06F 12/127
See application file for complete search history.

(56) References Cited

U.S. PATENT DOCUMENTS

| | | | |
|---|---|---|---|
| 8,549,243 B2 | 10/2013 | Coronado et al. | |
| 8,639,880 B2 | 1/2014 | Augenstein et al. | |
| 8,688,635 B2 | 4/2014 | Reed et al. | |
| 2005/0015409 A1 | 1/2005 | Cheng et al. | |
| 2007/0113157 A1 | 5/2007 | Perego | |
| 2010/0191708 A1 | 7/2010 | Brixius et al. | |
| 2012/0233437 A1 | 9/2012 | Usami | |
| 2014/0115709 A1 | 4/2014 | Gross et al. | |
| 2014/0181047 A1* | 6/2014 | Pawar ................. | G06F 11/1474 707/654 |

OTHER PUBLICATIONS

J. Cornette, "Managing Catalogs and HSM through Better Error Identification", IBM Corporation, Total Solution Event for System z 2013, pp. 87.

(Continued)

*Primary Examiner* — Arpan P. Savla
*Assistant Examiner* — William E Baughman
(74) *Attorney, Agent, or Firm* — William K. Konrad; Konrad Raynes Davda Victor LLP

(57) ABSTRACT

Provided are a computer program product, system, and method for an application to provide for, in one embodiment, using hierarchical storage management to respond to a request to delete a data set by migrating the data set to another storage tier in a storage system before deleting the data set from its current location. As a result, the data set is stored on another tier to provide an opportunity to reverse the decision to delete the data set. In one embodiment, a temporary interval of time is provided to reverse the deletion decision and restore the data set from the migrated data set, before the data set is permanently deleted.

15 Claims, 6 Drawing Sheets

(56) References Cited

OTHER PUBLICATIONS

"DataSet Catalog dialog box", IBM Knowledge Center, pp. 1, [online] [retrieved Jul. 29, 2014], http://www-01.ibm.com/support/knowledgecenter/SS5PJ9_5.1.0/com.ibm.oxes.doc/dlg_idcams_catalog.html.

"DataSet Delete dialog box", IBM Knowledge Center, pp. 1, [online] [retrieved Jul. 29, 2014], http://www-01.ibm.com/support/knowledgecenter/SS5PJ9_5.1.0/com.ibm.oxes.doc/dlg_idcams_delete.html%23dlg._idcams_delete.

"HSM CDS", IBM Knowledge Center, pp. 1, [online] [retrieved Jul. 29, 2014], http://www-01.ibm.com/support/knowledgecenter/SS5PJ9_5.1.0/com.ibm.oxes.doc/attr_hsm_cds.html.

"SMS Management Class", IBM Knowledge Center, pp. 1, [online] [retrieved Jul. 29, 2014], http://www-01.ibm.com/support/knowledgecenter/SS5PJ9_5.1.0/com.ibm.omegamon.stor.doc_4.2/attr_sms_man_cl.htm?cp=SS5JP9_5.1.0% 2F0-6-7-6-0-2-23-77.

\* cited by examiner

Storage Tier Information

Data Set Information

| STORAGE SYSTEM CATALOG | | | | |
|---|---|---|---|---|
| Entry no. | Data Set ID | Data Set Version no. | Data Set Location | Management Class |
|  |  |  |  |  |
|  |  |  |  |  |
|  |  |  |  |  |
|  |  |  |  |  |
|  |  |  |  |  |
|  |  |  |  |  |

| DELETION-MIGRATION CATALOG | | | | |
|---|---|---|---|---|
| Entry no. | Data Set ID | Data Set Version no. | Data Set Migration Location | Deletion Timestamp |
|  |  |  |  |  |
|  |  |  |  |  |
|  |  |  |  |  |
|  |  |  |  |  |
|  |  |  |  |  |
|  |  |  |  |  |

| DATA SET RESTORATION INTERFACE | | | | |
|---|---|---|---|---|
| Entry no. | Data Set Name | Data Set Version no. | Data Set Restoration Location | Deletion Timestamp |
|  |  |  |  |  |
|  |  |  |  |  |

DATA SET MANAGEMENT

BACKGROUND OF THE INVENTION

1. Field of the Invention

The present invention relates to a computer program product, system, and method for data set management.

2. Description of the Related Art

Hierarchical Storage Management HSM is a data storage technique which automatically moves data between a primary and a secondary storage tier. HSM is sometimes also referred to as tiered storage. In HSM systems, data files that are frequently used are stored on high-speed storage devices of the primary storage tier, such as such as Solid State devices (SSD), or hard disk drive arrays. They are more expensive per byte stored than slower devices of the secondary storage tier, such as optical discs and magnetic tape drives. The bulk of application data is stored on the slower low-cost secondary storage devices and copied to the faster high-cost disk drives when needed. In effect, HSM turns the fast disk drives into caches for the slower mass storage devices.

The HSM system automatically migrates data files from the primary disk drives to the secondary tape drives if they have not been used for a certain period of time, typically a few months. This data migration frees expensive disk space on the primary storage devices. If an application does reuse a file which is on a secondary storage device, it is automatically recalled, that is, moved back to the primary disk storage. Due to this transparent file recall capability, the file remains accessible from a client application although it has been physically migrated to the secondary storage. HSM is implemented, for example, in the Tivoli® Storage Manager.

HSM may include storage tiering which is the placement of data on different devices in the multi-tiered storage based on the type of usage, performance and capacity requirements of the data and the characteristics of the devices. Storage tiering is often a manual process where administrators manually assign data to different locations within the multi-tiered storage system.

Automated storage tiering programs automatically manage data placement by observing the characteristics of data in the multi-tiered storage and automatically moving the data among the different tiers of storage. Automated storage tiering decisions are based on observation of workloads or pre-set administrator policies which statically partition resources. To determine where to store data in a multi-tier storage system, a storage manager program will analyze data access patterns, workloads on the storage devices, and usage of the devices and determine the tiers and devices within tiers on which to locate data.

SUMMARY

Provided is hierarchical migration processing of data sets which includes deletion-migration processing to process a data set deletion request to delete a first data set by copying the first data set to a second hierarchical storage tier, and deleting the first data set from the first hierarchical storage tier. In this manner, the data set is available to be restored until it is permanently deleted.

BRIEF DESCRIPTION OF THE DRAWINGS

FIG. 4 illustrates an embodiment of a storage system catalog.

FIG. 5 illustrates an embodiment of a deletion-migration catalog.

FIG. 8 illustrates an interface for use in connection with restoration of a data set previously processed in accordance with deletion-migration operations.

DETAILED DESCRIPTION

Described embodiments provide techniques for, in one embodiment, using hierarchical storage management to respond to a request to delete a data set by migrating the data set to another storage tier in a storage system before deleting the data set from its current location. As a result, the data set is stored on another tier to provide an opportunity to reverse the decision to delete the data set. However, in one embodiment, the data set is marked for eventual physical deletion. Thus, in one embodiment, a temporary interval of time is provided to reverse the deletion decision and restore the data set from the migrated data set back to its original location or to another location within the storage system. In one aspect of the present description, deletion-migration processing may be provided by modifying existing hierarchical migration systems to provide an opportunity to reverse the decision to delete the data set, as explained in greater detail below.

Figure 1:
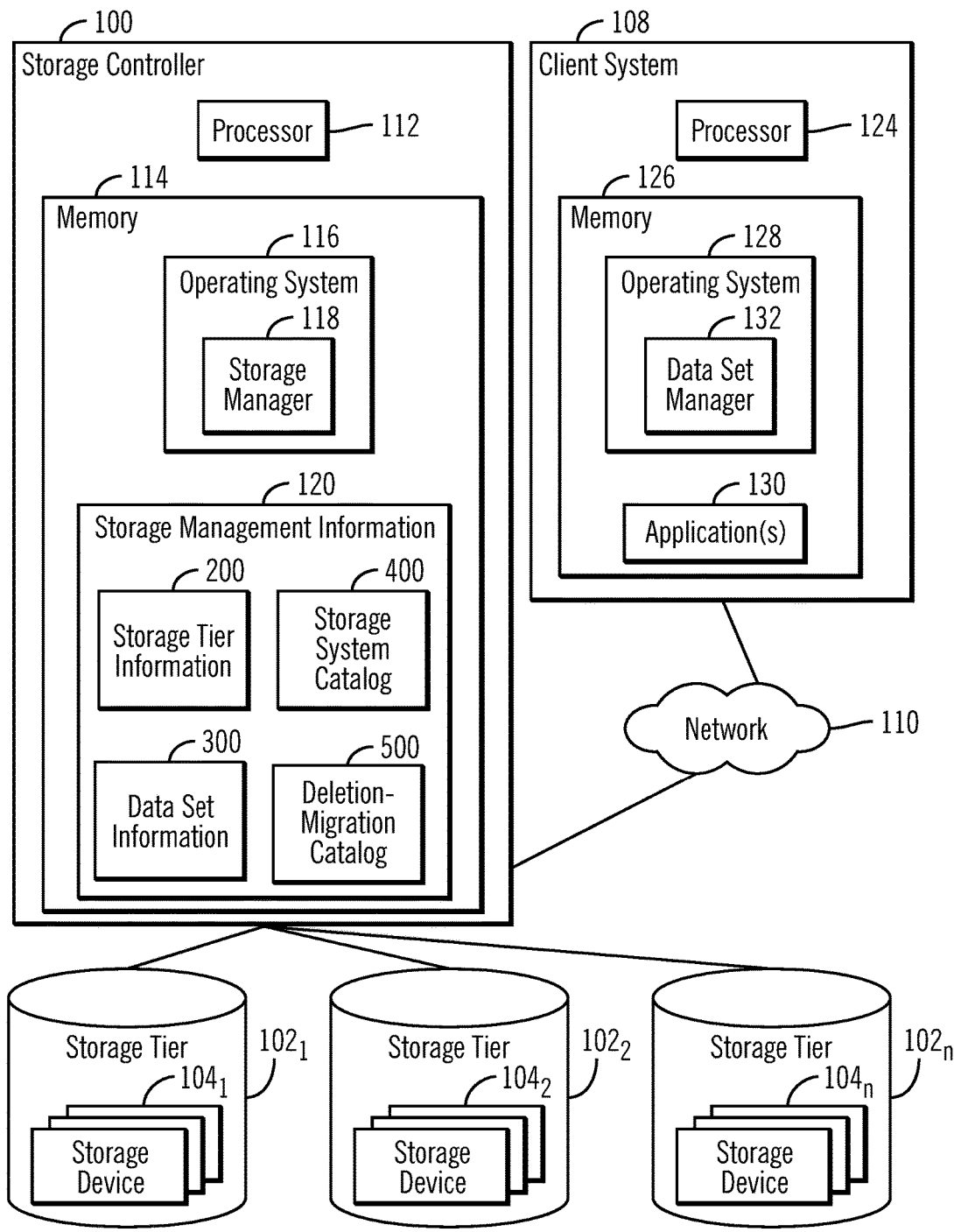
FIG. 1 illustrates an embodiment of a storage environment.

FIG. 1 illustrates a storage environment having a storage controller 100 managing the storage of data sets on multiple hierarchical storage tiers $102_1, 102_2 \ldots 102_n$, each tier having a plurality of storage devices $104_1, 104_2 \ldots 104_n$. Each storage tier $102_1, 102_2 \ldots 102_n$ may have storage devices $104_1, 104_2 \ldots 104_n$ with storage attributes that differ from the storage attributes of other tiers, where the storage attributes may indicate a quality of service, access speed, longevity of duration of storage, etc. A client system 108 communicates with the storage controller 100 over a network 110.

In the illustrated embodiment, each storage device $104_1, 104_2 \ldots 104_n$ is a physical unit having a storage capacity of one or more volumes. A volume is an identifiable unit of data storage that, in some embodiments, may be physically removable from the associated storage device $104_1, 104_2 \ldots 104_n$. Thus, in a particular storage tier $102_1, 102_2 \ldots 102_n$, in which the plurality of storage devices $104_1, 104_2 \ldots 104_n$ are hard disk drives, for example, a volume may be a removable hard disk, for example. In another storage tier $102_1, 102_2 \ldots 102_n$, in which the plurality of storage devices $104_1, 104_2 \ldots 104_n$ are tape drives, for example, a volume may be a tape cartridge, for example.

Each volume typically has a system-unique name or number that allows it to be specified by a user. In some embodiments, a physical storage device $104_1, 104_2 \ldots 104_n$ may be divided into several separately identifiable volumes, either physical or logical.

A disk drive track is a circular path on the surface of a disk on which information is magnetically recorded and from which recorded information is read. A physical track is a physical division of data in a disk drive. However, a physical track may include one or more logical tracks. Tracks may be subdivided into smaller units of storage including, blocks, sectors or pages, for example.

Data is stored in data storage locations which are identified by data storage addresses which identify the units of storage containing the particular storage locations. Hence, a data storage location may be uniquely identified by its data storage address which may include for example, a tier number, storage device number, volume number, track number, etc., which may be physical or logical.

A data set is a separately identifiable grouping of data. A data set typically comprises a plurality of members wherein each member is a portion of the data of the data set. One example of a data set is a file which may be identified by a file name, for example. Another example of a data set is the data stored in grouping of tracks often referred to as extents. Each extent is a member of the data set and is typically a grouping or range of physically contiguous tracks in a hard drive. A data set typically includes the data stored in multiple extents which are not physically contiguous to each other. A storage volume may store thousands of data sets in a typical storage system. Thus, the storage locations storing the data of a typical data set are usually a small fraction of the storage capacity of a volume. Also, the storage locations storing the data of a data set may not reside within a single volume but may reside in a number of different volumes.

The storage controller 100 includes a processor 112, comprising one or more processor devices and a memory 114 in which an operating system 116 is loaded to be executed by the processor 112. The operating system 116 includes a storage manager 118 to manage the storage of data in the storage tiers $102_1, 102_2 \ldots 102_n$ and perform hierarchical migration processing which migrates data sets between the storage tiers $102_1, 102_2 \ldots 102_n$ based on data management criteria, such as used in a multi-tiered storage system or hierarchical storage management system (HSM).

As with existing hierarchical migration systems, the storage devices $104_1, 104_2, \ldots 104_n$ may be grouped in multiple hierarchical tiers based on their performance with respect to data access, where each tier has a class of slower access devices than a previous (or higher) tier in the hierarchy of tiers. The arrangement of hierarchical storage tiers $102_1, 102_2 \ldots 102_n$ may be based on characteristics such as speed of their Input/Output (I/O) access profile, redundancy, etc. In one embodiment, the first tier may comprise memory, second tier solid state storage devices (SSD), third tier hard disk drive (HDDs), and fourth tier an archival storage medium, such as tape, optical disk or slower access hard disk drives. The storage manager 118 may manage the automatic transfer of data sets such as files, objects or other data groupings between tiers based upon characteristics of the data changing, such as frequency of access, size, etc.

The storage manager 118 maintains storage management information 120 to manage the storage of data sets in the storage tier, such as storage tier information 200 having information on the storage tiers $102_1, 102_2 \ldots 102_n$, data set information 300 having information on each data set stored in the storage tiers $102_1, 102_2 \ldots 102_n$, storage system catalog 400 containing a list of entries identifying the data sets stored in the storage tiers $102_1, 102_2 \ldots 102_n$, and a deletion-migration catalog 500 containing a list of entries identifying the data sets migrated to a lower level storage tier of the storage tiers $102_1, 102_2 \ldots 102_n$ in response to a deletion request.

The client system 108 includes a processor 124 and a memory 126 storing programs executed by the processor 124, including an operating system 128 and applications 130. The application 130 may generate data set management operations to send to the storage controller 100. Further a data set manager 132 at the client 108 may also generate data set management operations for the storage controller 100 to manage the storage of application data sets in the storage tiers $102_1, 102_2 \ldots 102_n$.

In the embodiment of FIG. 1, the application 130 executes in a client system 108 that communicates with the storage controller 100 over the network 110. In a further embodiment, the applications 130 may execute in the storage controller 100 and send data set management commands to the storage manager 118 within the memory 114 of the storage controller 100. Yet further, the application 130 may execute on a blade within the same unit as the storage controller 100 or in a virtual virtualization layer executing on the same hardware platform or host in which a storage controller 100 virtualization layer is implemented. The network 110 may comprise a Storage Area Network (SAN), Wide Area Network (WAN), Local Area Network (LAN), the Internet, and Intranet, a wireless network, wired network, etc.

The storage devices $104_1, 104_2 \ldots 104_n$ may comprise different types or classes of storage devices, such as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The storage devices $104_1, 104_2 \ldots 104n$ may further be configured into an array of devices, such as Just a Bunch of Disks (JBOD), Direct Access Storage Device (DASD), Redundant Array of Independent Disks (RAID) array, virtualization device, etc. Further, the storage devices $104_1, 104_2 \ldots 104n$ may comprise heterogeneous storage devices from different vendors.

The memories 114 and 126 may comprise one or more volatile or non-volatile memory devices. The storage manager 118, application 130 and data set manager 132 may be implemented as a program that is part of the operating systems 116, 128. Alternatively, the storage manager 118, application 130 and data set manager 132 may be implemented as application code external to the operating systems 116, 128 or may be implemented with hardware logic, such as an Application Specific Integrated Circuit (ASIC), or as a programmable processor executing code in a computer readable storage medium.

Figure 2:
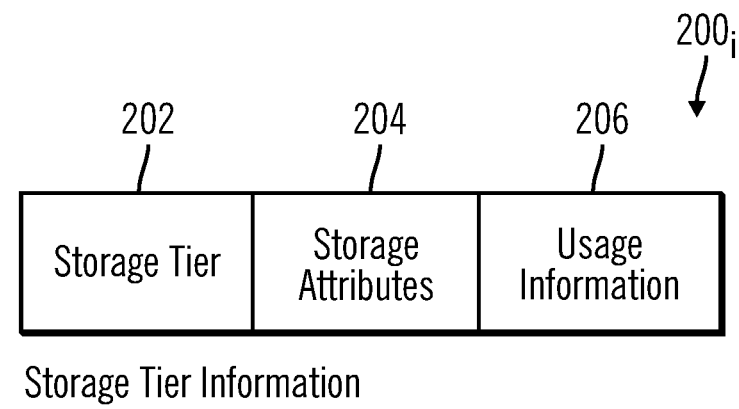
FIG. 2 illustrates an embodiment of storage tier information.

FIG. 2 illustrates an instance $200_i$ of the storage tier information 200 maintained for each of the managed storage tiers $102_1, 102_2 \ldots 102_n$, including a storage tier identifier 202; storage attributes 204 of the tier 202, such as the access characteristics, quality of service level, speed, durability, cost, etc.; and usage information 206 having information on the current usage level of the storage tier 202, such as number and characteristics of application accesses, available storage space, etc.

Figure 3:
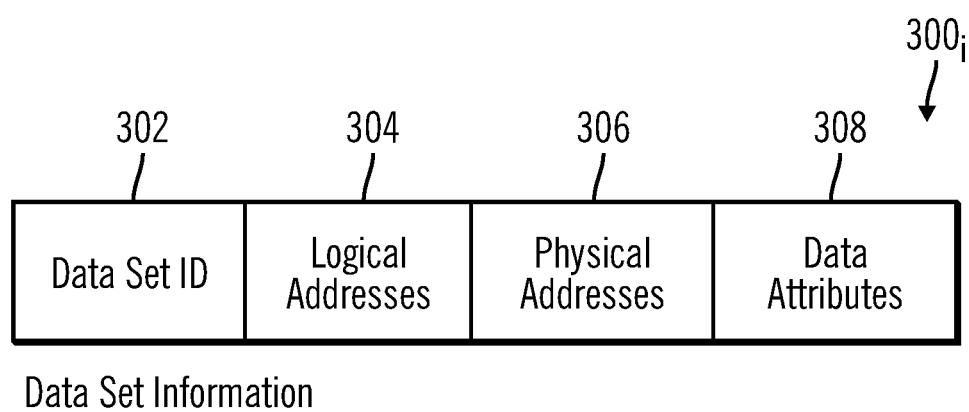
FIG. 3 illustrates an embodiment of data set information.

FIG. 3 illustrates an instance $300_i$ of the data set information 300 maintained for each data set stored in the storage tiers $102_1, 102_2 \ldots 102_n$, including a data set identifier (ID) 302; the logical addresses 304 of the data storage locations at which the data set 302 is stored; the physical addresses 306 in one of the storage tiers $102_1, 102_2 \ldots 102_n$ at which the data set 302 is stored; and data attributes 308 of the data set, such as access characteristics, details on the application 130 that owns or accesses the data set, type of data (e.g., critical, non-critical, user data, backup data, etc.). In accordance with one aspect of the present description, the data attributes 308 may also include an indication as to whether the associated data set is eligible for deletion-migration processing in response to a deletion request.

FIG. 4 illustrates an instance $400_i$ of the storage system catalog 400 containing a list of entries $402_1, 402_2 \ldots 402_n$, identifying the data sets stored in the storage tiers $102_1, 102_2 \ldots 102_n$ with the exception of the data sets migrated to a storage tier of the storage tiers $102_1, 102_2 \ldots 102_n$ in response to a deletion request. Thus, the data sets identified by the storage system catalog $400_i$ are the active data sets which are in use and have not been deleted.

In the example of FIG. 4, each entry $402_1, 402_2 \ldots 402_n$ for a data set identifies the data set ID or name, the data set version number in that there may be different versions of data sets having the same data set ID, and the location or locations at which the data set is stored, including for example, the tier no., device no., volume no., extent no. and track nos. at which each extent of the data set is stored. The data set location information may be one or more of the logical addresses 304 (FIG. 3) and the physical addresses 306 of the data set. In some embodiments, the data set location information may be a subset of or a pointer to one or more of the logical addresses 304 (FIG. 3) and the physical addresses 306 of the data set.

Another field of each entry $402_1, 402_2 \ldots 402_n$ for a data set identifies the management class to which the data set belongs and any options which have been selected for the data set. In accordance with the present description, one management class option may indicate whether the associated data set is eligible for migration to another tier in response to a deletion request. As explained in greater detail below, if the particular data set is not eligible for deletion-migration in response to a deletion request, the data set is not migrated and is physically deleted. In addition, the storage system catalog entry for the data set is removed from the storage system catalog $400_i$. It is appreciated that the catalog entries identifying data sets stored in a storage system may have other fields in addition thereto or instead of those shown, depending upon the particular application.

FIG. 5 illustrates an instance $500_i$ of the deletion-migration catalog 500 containing a list of entries $502_1, 502_2 \ldots 502_n$, identifying the data sets migrated to a another storage tier of the storage tiers $102_1, 102_2 \ldots 102_n$ in response to a deletion request. Once a data set has been migrated to a storage tier of the storage tiers $102_1, 102_2 \ldots 102_n$ in response to a deletion request, the corresponding entry for that data set in is removed from the storage system catalog $400_i$.

A request has been made by a user, application or operating system to delete the data set for each of the data sets identified by the deletion-migration catalog $500_i$. hence, the data sets identified by the deletion-migration catalog $500_i$ are not active but have not yet been permanently deleted from the storage system. Instead, the entries of the deletion-migration catalog $500_i$ mark the data sets of the deletion-migration catalog $500_i$ for eventual physical deletion. Accordingly, a user is afforded an opportunity to reverse the decision to delete each data set listed in the deletion-migration catalog $500_i$ and restore the data set as an active data set before the data set is permanently deleted.

In the illustrated embodiment, the data sets identified by the storage system catalog $400_i$ are automatically migrated from one storage tier to the next, typically lower, storage tier in accordance with a particular data set migration policy. Each time a data set of the storage system catalog $400_i$ is migrated, the entry for that data set in the storage system catalog $400_i$ is updated to indicate the new migration location of the data set. However, in the illustrated embodiment, the data sets listed in the deletion-migration catalog $500_i$ are not migrated beyond the initial migration of the data set in response to a deletion request. Hence, when a data set listed in the deletion-migration catalog $500_i$ would otherwise be automatically migrated in accordance with the migration policy of the storage system, the data set is instead permanently deleted from the storage system. As a result, in the illustrated embodiment, the opportunity to reverse the deletion request for a data set listed in the deletion-migration catalog $500_i$ and restore the data set as an active data set before the data set is permanently deleted, is limited. Once a data set listed in the deletion-migration catalog $500_i$ is physically deleted, the entry for that data set in the deletion-migration catalog $500_i$ is removed from the deletion-migration catalog $500_i$.

Figure 6:
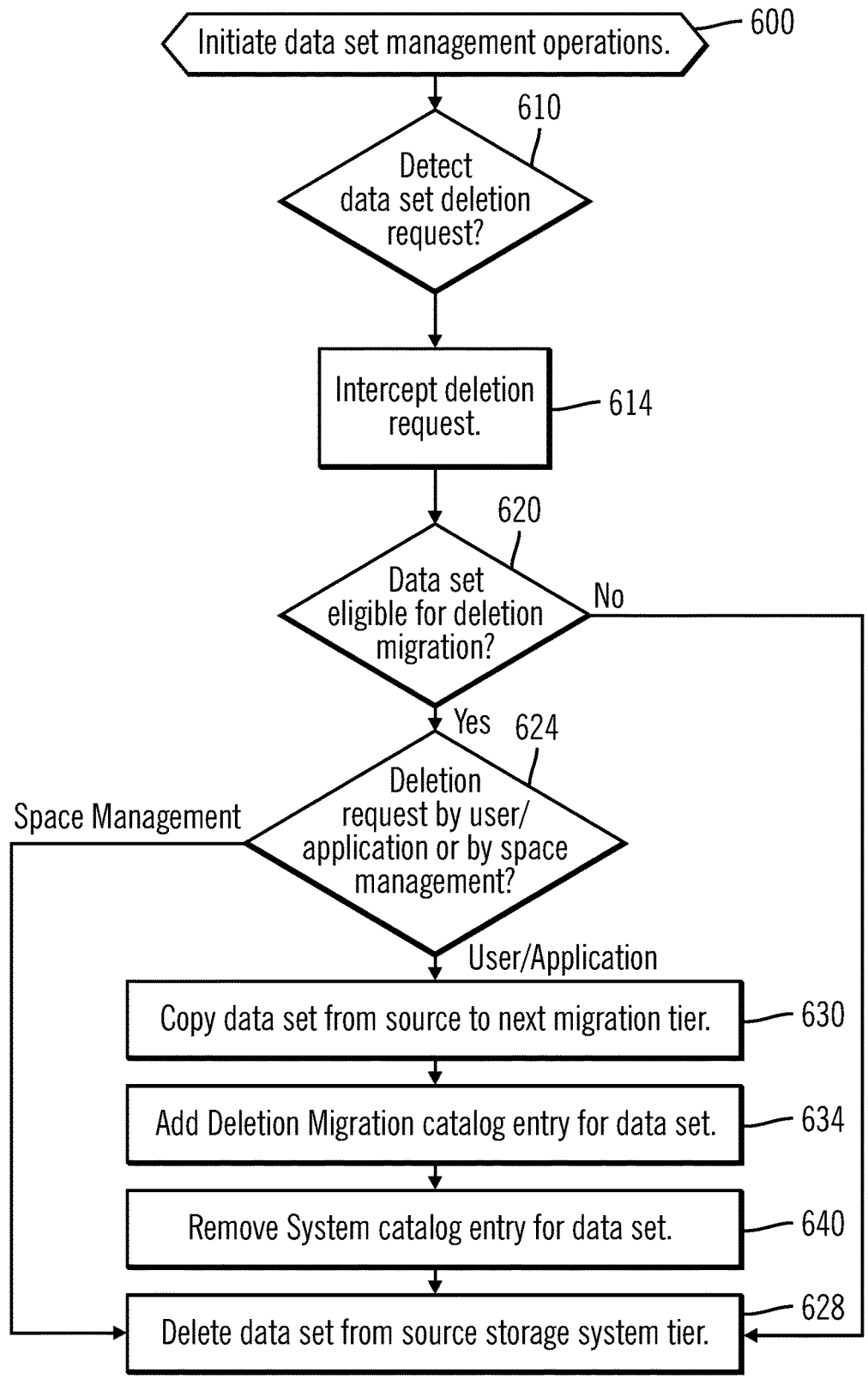
FIG. 6 illustrates an embodiment of hierarchical migration operations which include deletion-migration operations.

FIG. 6 illustrates an embodiment of operations performed by the storage manager 118 to perform data set management operations. Upon initiating (at block 600) data set management operations including hierarchical migration processing of data sets, a monitoring operation of a deletion-migration processing in accordance with the present description, monitors requests to delete a data set. If a data set deletion request is detected (block 610), the deletion request is intercepted (block 614) by the deletion-migration processing rather than being immediately executed which would have physically deleted the data set from the entire storage system.

A determination is made (block 620) by the deletion-migration processing as to whether the data set which is the subject of the deletion request is eligible for deletion-migration in accordance with the present description instead of immediate and complete physical deletion. If it is determined that the data set which is the subject of the deletion request is not eligible for deletion-migration, the subject data is physically deleted (block 628).

As set forth above, in one embodiment, a field of the management class entry for the subject data set in the storage system catalog $400_i$ may be inspected to determine if the data set which is the subject of the deletion request is eligible for deletion-migration instead of immediate and complete physical deletion. Similarly, a field of the data attributes 308 (FIG. 3) for the subject data set in the data set information $300_i$ may be inspected to determine if the data set which is the subject of the deletion request is eligible for deletion-migration instead of complete physical deletion. It is appreciated that such eligibility information may be stored for data sets in a variety of locations, depending upon the particular application. It is further appreciated that in some embodiments, all data sets may be deemed eligible for deletion-migration instead of complete physical deletion. In such embodiments, an eligibility inquiry may be omitted, for example.

In the illustrated embodiment, another determination is made (block 624) as to whether the intercepted deletion request was made by a user (either directly as a system operator, or through an executing application, for example) or was made by a space management function of the hierarchical storage management that automatically seeks to delete data sets based upon various criteria such as, for example, expiration of a retention/expiration period associated with a particular data set.

In one embodiment, if the deletion request for the subject data set originated from a space management function of the hierarchical storage management migration processing, the data set is physical deleted (block 628) notwithstanding eligibility for deletion-migration. It is appreciated that in other embodiments, deletion-migration may be provided even for data sets marked for deletion by a space management function.

If it is determined (block 620) that the data set which is the subject of the deletion request is eligible for deletion-migration instead of immediate and complete physical deletion, and it is determined (block 624) that the intercepted deletion request was made by a user (either directly as a system operator, or through an executing application), deletion-migration processing is invoked to migrate the data set using the hierarchical storage management migration system modified in accordance with the present description, rather than immediately deleting the data set. Accordingly, the subject data set is copied (block 630) by the hierarchical migration system from its current location of its current tier level (the source), to a migration location of a different migration tier. For example, in one embodiment, the first tier may comprise memory, second tier solid state storage devices (SSD), third tier hard disk drive (HDDs), and fourth tier an archival storage medium, such as tape, optical disk or slower access hard disk drives. Thus, if the data set which is the subject of the deletion request is currently stored in the third tier hard disk drives, the storage manager 118 may copy the data set from its location in the third tier to the next lower (for example, slower access) or tier, that is, the fourth tier which may be provided by an archival storage medium, such as tape.

An entry may be added (block 634) to the deletion-migration catalog $500_i$ (FIG. 5) for the data set which is the subject of the deletion request, identifying the data set ID, data set version and the location within the fourth tier to which the data set was copied. In one embodiment, a deletion timestamp may be provided for the deletion-migration catalog entry, indicating when the subject data set was migrated to the fourth tier instead of being deleted. Thus, the data set ID and data set version number together with the deletion-migration timestamp, can uniquely identify the data set. As a consequence, multiple data sets of the same name can be retained in cases where a data set is "deleted" (that is, deletion-migrated), redefined, "deleted" (that is, deletion-migrated), and so on.

In this manner, a data set which is processed with a deletion-migration process in accordance with the present description, may be marked for potential restoration and eventual physical deletion if not restored, instead of being immediately deleted in response to a deletion request for that data set. Hence, each entry of the deletion-migration catalog $500_i$ indicates a data set which has been marked for eventual deletion but may be restored should the decision to delete the data set be reversed within the restoration opportunity interval before the data set is deleted from the tier to which it was migrated in response to the deletion request.

In addition, the corresponding entry for the subject data set in the storage system catalog $400_i$ (FIG. 4) may be removed (block 640) using the hierarchical storage management migration system modified in accordance with the present description, since the subject data set is no longer active. In addition, the data set which was the subject of the deletion request is physically deleted (block 622) (again using the hierarchical storage management migration system modified in accordance with the present description), from the source tier but not from the migration target tier to complete the migration process. In the example above, the subject data set was migrated from the third tier (the source tier) to the migration target tier (the fourth tier). In this example, the subject data set is physically deleted (block 622) from the third tier (the source tier) but is not deleted immediately from the migration target tier (the fourth tier).

By removing the corresponding entry for the subject data set from the storage system catalog $400_i$, the subject data set is effectively "deleted" (that is, deletion-migrated) and is no longer active and is no longer available to be accessed for regular data operations. In addition, a data set having the same data set ID as the deletion-migrated data set may be added to the storage system in the same manner as if the deletion-migrated data set which was the subject of the deletion request had been actually entirely physically deleted from the storage system. However, until the deletion-migrated data set is actually physically deleted from the fourth tier, the user has the option of restoring the migrated data set to active status as explained below.

Figure 7:
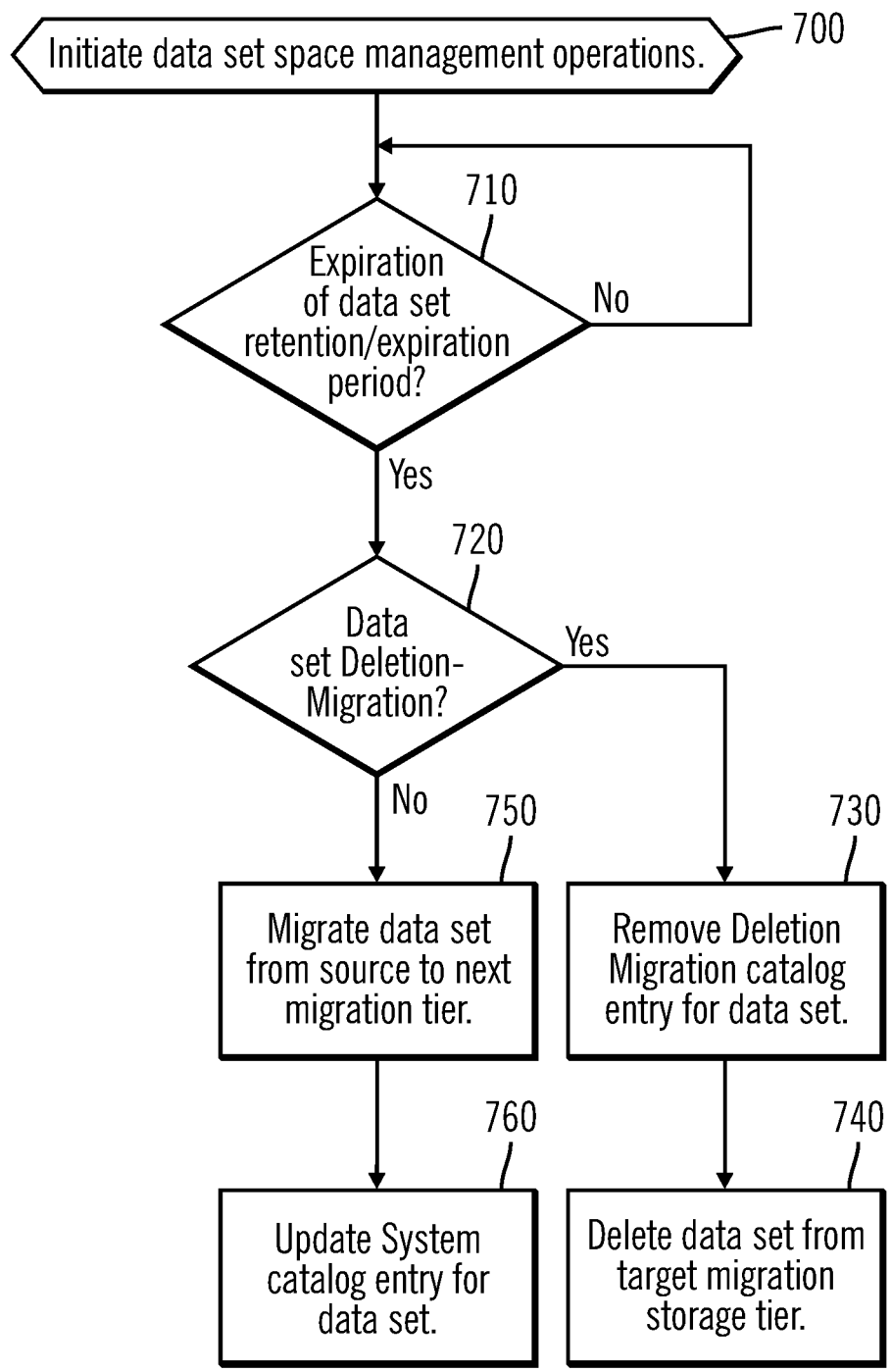
FIG. 7 illustrates another embodiment of hierarchical migration operations which include deletion-migration operations.

FIG. 7 illustrates another embodiment of operations performed by the storage manager 118 to perform data set management operations. Upon initiating (at block 700) data set management operations including hierarchical storage management migration processing of data sets, a monitoring operation of a hierarchical migration processing in accordance with the present description, monitors whether the data sets of the storage system are to be automatically migrated from one storage tier to the next storage tier in accordance with a particular data set migration policy. Thus, a space management function automatically seeks to migrate data sets from higher order tiers to the next lower order tier based upon various criteria such as, for example, expiration of a retention/expiration period associated with a particular data set.

Accordingly, a determination is made (block 710) as to whether a retention/expiration period has expired for a particular data set. If so, in one embodiment, a determination is made (block 720) as to whether the data set has been deletion-migrated as indicated by, for example, the presence of an entry in the deletion-migration catalog $500_i$ for that data set. If so, the data set is not migrated again to another migration tier. Instead, the entry in the deletion-migration catalog $500_i$ for that data set is removed (block 730) and the data set is physically deleted (block 740) from the target migration storage level or tier.

In the example above, the subject data set was deletion-migrated from the third tier (the source tier) to the migration target tier (the fourth tier). Accordingly, in this example, the subject data set is physically deleted (block 740) from the migration target tier (the fourth tier). At this point, the data set which was the subject of the original deletion request (block 624, FIG. 6) has been completely removed from the storage system and is no longer available to be restored.

Alternatively, if it is determined (block 720) that the data set has not been deletion-migrated as indicated by, for example, the absence of any entry in the deletion-migration catalog $500_i$ for that data set, the data set is migrated (block 750) to another migration tier in accordance with the usual data set migration policy. Thus, in this example, a space management function of a hierarchical migration system modified in accordance with the present description, migrates the particular data set which is not currently deletion-migrated, from a higher order tier to the next lower order tier upon the expiration of a retention/expiration period associated with the particular data set. In migrating the data set, the data set is copied from its current location of its current tier (the source location) to the target migration tier (the target location) and is deleted from the source location. The storage system catalog $400i$ (FIG. 4) may be updated (block 760) to indicate the new location of the data set which is the target location after the migration of the data set.

For those data sets which are deletion-migrated in accordance with the present description instead of being physically deleted in response to a deletion request, an opportunity to restore the deletion-migrated data set is provided for an interval of time. In the illustrated embodiment, the restoration opportunity interval occurs between the time the deletion request was intercepted ((block 614, FIG. 6) and the time the data set was physically deleted (block 740, FIG. 7) from the target migration storage tier pursuant to a space management policy, for example. It is appreciated that a restoration opportunity interval may be provided as a function of other data set management functions, depending upon the particular application. It is further appreciated that in other embodiments, the deletion-migration processed data sets may be retained within the storage system indefinitely, to provide a restoration opportunity interval of indefinite length.

In another aspect, a user interface may be provided to facilitate restoring a data set which had been marked for eventual deletion. For example, a user interface may provide a user the opportunity to query entries of the deletion-migration catalog $500_i$ (FIG. 5) to identify data sets which although marked for eventual deletion, are nonetheless available for restoration since they have not yet been physically deleted. In one embodiment, queries may be based upon the fields of the deletion-migration catalog including data set ID's, version numbers, locations or deletion timestamp dates. The query may be based upon a specific value or a range of values for the fields of the deletion-migration catalog.

FIG. 8 shows an example of an interactive display $800_i$ which may be returned in response to a user query to identify data sets which although marked for eventual deletion, are nonetheless available for restoration since they have not yet been physically deleted. In this example, the entries of the interactive display $800_i$ are a subset of the entries of the deletion-migration catalog $500_i$ and are the entries which match or fit within the range of values specified by the user query. Using the interactive display $800_i$ the user may select which data set or data set version to restore to active status.

In this embodiment, the user may also choose to rename the selected data set to a different data set ID. The user is also given the option of restoring the data set either to the original or to a different set of volumes.

Accordingly, the subject data set selected by the user for restoration is copied by the hierarchical migration system from its current location of its current tier level (the migration tier), to the restoration location which may be the original (source) location or another restoration location identified by the user. Thus, if the data set which was the subject of the deletion-migration processing and is now the subject of the restoration request is currently stored in the fourth tier which may be provided by an archival storage medium, such as tape, for example, the data set may be copied by the storage manager 118 to a higher tier such as one of the tiers one through three, for example, which may be provided by hard drives of various access speeds, for example. In addition, in some embodiments, the migrated copy of the data set migrated by the deletion-migration processing to the migration tier may be removed from the migration location.

Further, an entry for the subject data set being restored may be added to the storage system catalog $400_i$ (FIG. 4) using the hierarchical storage management migration system modified in accordance with the present description, identifying the restoration location of the restored data set since the subject data set is now active again and is stored at the restoration location identified by the user. Accordingly, the data set restored to the identified restoration location is restored to active status and is available to be accessed for regular data operations. Conversely, in some embodiments, the entry for the subject data set being restored may be removed from the deletion-migration catalog $500_i$ (FIG. 5) since the subject data set has been restored to the restoration location and removed from the migration location. In other embodiments, the migration copy of the restored data set may remain at the migration location and the entry for the subject data set being restored may remain in the deletion-migration catalog $500_i$ (FIG. 5).

In this manner, a data set which is processed with a deletion-migration process in accordance with the present description, is available for restoration instead of being immediately deleted in response to a deletion request for that data set.

Although the deletion-migration processing is described in connection with a hierarchical storage management system such as a System z HSM marketed by International Business Machines, which may be modified to provide for deletion-migration in accordance with the present description, it is appreciated that deletion-migration processing in accordance with the present description may be applied to a variety of storage systems, depending upon the particular application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
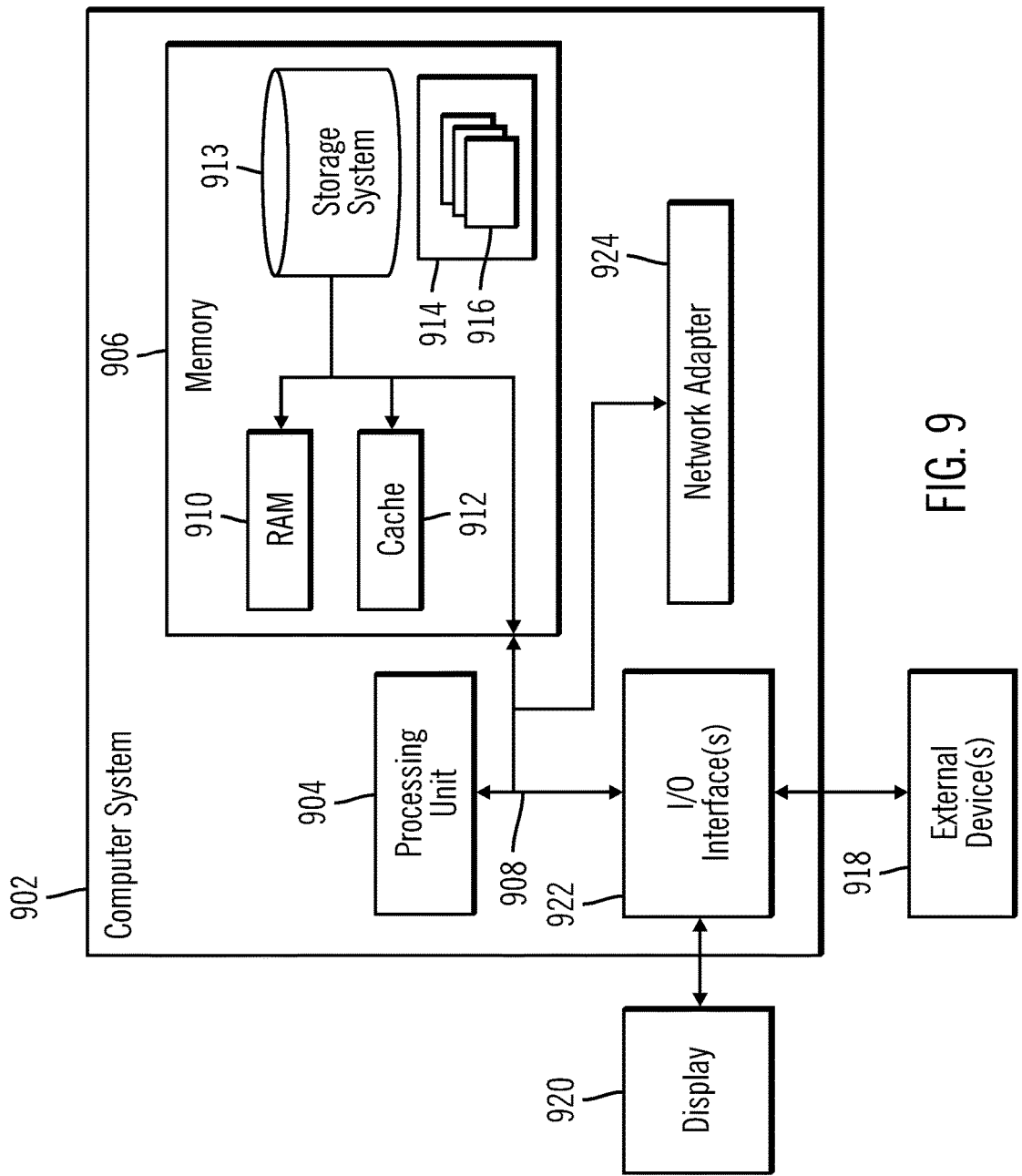
FIG. 9 illustrates an embodiment of a computer architecture used with described embodiments.

The storage controller 100 and client system 108, and components therein, may be implemented in one or more computer systems, such as the computer system 902 shown in FIG. 9. If the components of the network computing environment of FIG. 1 are implemented in multiple systems, then the systems may communicate over the network 4. Computer system/server 902 may be described in the general context of computer system executable instructions, such as program modules, being executed by a computer system. Generally, program modules may include routines, programs, objects, components, logic, data structures, and so on that perform particular resources or implement particular abstract data types. Computer system/server 902 may be practiced in distributed cloud computing environments where resources are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 916 which generally carry out the functions and/or methodologies of embodiments of the invention as described herein.

Computer system/server 902 may also communicate with one or more external devices 918 such as a keyboard, a pointing device, a display 920, etc.; one or more devices that enable a user to interact with computer system/server 12; and/or any devices (e.g., network card, modem, etc.) that enable computer system/server 902 to communicate with one or more other computing devices. Such communication can occur via Input/output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing storage of data sets from an application in hierarchical storage tiers of storage devices in a storage system, wherein each hierarchical storage tier of storage devices has storage devices with different storage attributes, the computer program product comprising a computer readable storage medium having computer readable program code embodied therein that executes to perform operations, the operations comprising:
   hierarchical migration processing data sets including migrating data sets from one hierarchical storage tier to another hierarchical storage tier; and
   prior to copying a first data set stored in a first storage tier for storage in a second hierarchical storage tier so that the first data set has not yet been copied for storage in the second hierarchical storage tier:
      receiving a deletion request to delete the first data set stored in the first hierarchical storage tier; and
      determining if the first data set of the deletion request is eligible for deletion-migration processing;
   in response to a determination that the first data set of the deletion request is eligible for deletion-migration processing, deletion-migration processing the deletion request, the deletion-migration processing including using the hierarchical migration processing to:
      copy the first data set to the second hierarchical storage tier; and
      delete the data set from the first hierarchical storage tier; and
   in response to a determination that the first data set of the deletion request is not eligible for deletion-migration processing, deleting the first data set from the first hierarchical storage tier without copying the first data set to the second hierarchical storage tier.

2. The computer program product of claim 1, wherein the hierarchical migration processing includes deleting a data set upon expiration of a retention period associated with the data set, and wherein the deletion request receiving includes detecting a request to delete the first data set stored in the first hierarchical storage tier and determining whether the deletion request for the first data set is associated with expiration of a retention period associated with the first data set of the deletion request, and wherein the deletion-migration processing is performed in response to a determination that the deletion request for the first data set is not associated with expiration of a retention period associated with the first data set of the deletion request.

3. The computer program product of claim 1, wherein the first data set of the request to delete the data set stored in the first hierarchical storage tier has a first entry in a storage system catalog identifying the first data set and the location within the hierarchical storage tier in which the data set is stored, and wherein the deletion-migration processing further includes:
   deleting the first entry of the storage system catalog for the first data set of the request to delete the first data set; and
   entering a second entry in a deletion-migration catalog of entries of data sets wherein the second entry identifies the first data set as being processed by the deletion-migration processing and the location within the second hierarchical storage tier to which the first data set was migrated by the deletion-migration processing.

4. The computer program product of claim 3, wherein the operations further comprise:
   receiving a query associated with the deletion-migration catalog of entries of data sets processed by the deletion-migration processing; and
   in response to the query, indicating data sets which are available for restoration based upon the deletion-migration catalog of entries of data sets processed by the deletion-migration processing.

5. The computer program product of claim 4, wherein the operations further comprise:
receiving a selection of a data set indicated to be available for restoration; and
restoring the selected data set, said restoring including:
storing the first data set in a location within a hierarchical storage tier identified by a user; and
entering a third entry in the storage system catalog identifying the first data set and the location within the hierarchical storage tier identified by the user in which the first data set is stored after restoration.

6. A method for managing storage of data sets from an application in hierarchical storage tiers of storage devices in a storage system, wherein each hierarchical storage tier of storage devices has storage devices with different storage attributes, the method comprising:
hierarchical migration processing data sets including migrating data sets from one hierarchical storage tier to another hierarchical storage tier; and
prior to copying a first data set stored in a first storage tier for storage in a second hierarchical storage tier so that the first data set has not yet been copied for storage in the second hierarchical storage tier:
receiving a deletion request to delete the first data set stored in the first hierarchical storage tier; and
determining if the first data set of the deletion request is eligible for deletion-migration processing;
in response to a determination that the first data set of the deletion request is eligible for deletion-migration processing, deletion-migration processing the deletion request, the deletion-migration processing including using the hierarchical migration processing to:
copy the first data set to the second hierarchical storage tier; and
delete the data set from the first hierarchical storage tier; and
in response to a determination that the first data set of the deletion request is not eligible for deletion-migration processing, deleting the first data set from the first hierarchical storage tier without copying the first data set to the second hierarchical storage tier.

7. The method of claim 6, wherein the hierarchical migration processing includes deleting a data set upon expiration of a retention period associated with the data set, and wherein the deletion request receiving includes detecting a request to delete the first data set stored in the first hierarchical storage tier and determining whether the deletion request for the first data set is associated with expiration of a retention period associated with the first data set of the deletion request, and wherein the deletion-migration processing is performed in response to a determination that the deletion request for the first data set is not associated with expiration of a retention period associated with the first data set of the deletion request.

8. The method of claim 6, wherein the first data set of the request to delete the data set stored in the first hierarchical storage tier has a first entry in a storage system catalog identifying the first data set and the location within the hierarchical storage tier in which the data set is stored, and wherein the deletion-migration processing further includes:
deleting the first entry of the storage system catalog for the first data set of the request to delete the first data set; and
entering a second entry in a deletion-migration catalog of entries of data sets wherein the second entry identifies the first data set as being processed by the deletion-migration processing and the location within the second hierarchical storage tier to which the first data set was migrated by the deletion-migration processing.

9. The method of claim 8, further comprising:
receiving a query associated with the deletion-migration catalog of entries of data sets processed by the deletion-migration processing; and
in response to the query, indicating data sets which are available for restoration based upon the deletion-migration catalog of entries of data sets processed by the deletion-migration processing.

10. The method of claim 9, further comprising:
receiving a selection of a data set indicated to be available for restoration; and
restoring the selected data set, said restoring including:
storing the first data set in a location within a hierarchical storage tier identified by a user; and
entering a third entry in the storage system catalog identifying the first data set and the location within the hierarchical storage tier identified by the user in which the first data set is stored after restoration.

11. A system for managing storage of data sets from an application in hierarchical storage tiers of storage devices in a storage system, wherein each hierarchical storage tier of storage devices has storage devices with different storage attributes, the system comprising:
a processor; and
a computer readable storage medium having code executed by the processor to perform operations, the operations comprising:
hierarchical migration processing data sets including migrating data sets from one hierarchical storage tier to another hierarchical storage tier; and
prior to copying a first data set stored in a first storage tier for storage in a second hierarchical storage tier so that the first data set has not yet been copied for storage in the second hierarchical storage tier:
receiving a deletion request to delete a first data set stored in a first hierarchical storage tier; and
determining if the first data set of the deletion request is eligible for deletion-migration processing;
in response to a determination that the first data set of the deletion request is eligible for deletion-migration processing, deletion-migration processing the deletion request, the deletion-migration processing including using the hierarchical migration processing to:
copy the first data set to the second hierarchical storage tier; and
delete the data set from the first hierarchical storage tier; and
in response to a determination that the first data set of the deletion request is not eligible for deletion-migration processing, deleting the first data set from the first hierarchical storage tier without copying the first data set to the second hierarchical storage tier.

12. The system of claim 11, wherein the hierarchical migration processing includes deleting a data set upon expiration of a retention period associated with the data set, and wherein the deletion request receiving includes detecting a request to delete the first data set stored in the first hierarchical storage tier and determining whether the deletion request for the first data set is associated with expiration of a retention period associated with the first data set of the deletion request, and wherein the deletion-migration processing is performed in response to a determination that the deletion request for the first data set is not associated with expiration of a retention period associated with the first data set of the deletion request.

13. The system of claim 11, wherein the storage medium further has a storage system catalog having entries identifying data sets and the locations within the hierarchical storage tier in which the data sets are stored, and a deletion-migration catalog having entries identifying data sets processed by the deletion-migration processing and the location within the second hierarchical storage tier to which the data sets were migrated by the deletion-migration processing, wherein the first data set of the request to delete the data set stored in the first hierarchical storage tier has a first entry in the storage system catalog identifying the first data set and the location within the hierarchical storage tier in which the first data set is stored, and wherein the deletion-migration processing further includes:

deleting the first entry of the storage system catalog for the first data set of the request to delete the first data set; and entering a second entry in the deletion-migration catalog of entries of data sets wherein the second entry identifies the first data set as being processed by the deletion-migration processing and the location within the second hierarchical storage tier to which the first data set was migrated by the deletion-migration processing.

14. The system of claim 13, wherein the operations further comprise:

receiving a query associated with the deletion-migration catalog of entries of data sets processed by the deletion-migration processing; and in response to the query, indicating data sets which are available for restoration based upon the deletion-migration catalog of entries of data sets processed by the deletion-migration processing.

15. The system of claim 14, wherein the operations further comprise:

receiving a selection of a data set indicated to be available for restoration; and restoring the selected data set, said restoring including:

storing the first data set in a location within a hierarchical storage tier identified by a user; and entering a third entry in the storage system catalog identifying the first data set and the location within the hierarchical storage tier identified by the user in which the first data set is stored after restoration.

\* \* \* \* \*